United States Patent [19]

Yung

[11] Patent Number: 4,961,224
[45] Date of Patent: Oct. 2, 1990

[54] CONTROLLING ACCESS TO NETWORK RESOURCES

[76] Inventor: Darby Yung, 1 Richmond Street West, Toronto, Ontario, Canada, M5H 1Y8

[21] Appl. No.: 319,277
[22] Filed: Mar. 6, 1989
[51] Int. Cl.$^5$ .................. H04L 9/32; H04L 12/22
[52] U.S. Cl. ........................ 380/25; 380/4; 380/23; 380/50; 340/825.31; 340/825.34
[58] Field of Search ................ 380/23–25, 380/49, 50, 3, 4; 340/825.31, 825.34; 364/200, 900

[56] References Cited

U.S. PATENT DOCUMENTS

| | | | |
|---|---|---|---|
| 4,295,041 | 10/1981 | Ugon | 380/23 X |
| 4,455,602 | 6/1984 | Baxter, III et al. | 364/200 |
| 4,525,780 | 6/1985 | Bratt et al. | 364/200 |
| 4,588,991 | 5/1986 | Atalla | 340/825.31 |
| 4,652,698 | 3/1987 | Hale et al. | 380/24 |
| 4,675,815 | 6/1987 | Kuroki et al. | 380/24 X |
| 4,757,533 | 7/1988 | Allen et al. | 380/25 |

*Primary Examiner*—Stephen C. Buczinski
*Assistant Examiner*—Bernarr Earl Gregory
*Attorney, Agent, or Firm*—Sim & McBurney

[57] ABSTRACT

A network includes digital computers, resources such as disk drives, printers and modems or disk files, file records or tasks, and a communications channel permitting data transfer between each digital computer and the resources. The function of mediating conflicting demands for network resources is distributed among the digital computers. A file server or other storage device connected to the communications channel contains an access log. Each digital computer accesses a required resource by first recording an entry in the access log identifying the required resource and then scanning the access log to locate any conflicting entry identifying the same resource. The access procedure is terminated if the conflicting entry is located and the recorded entry is then deleted. The digital computer otherwise accesses the required resource and deletes the recorded entry once use of the resource has terminated. Access to resources is restricted according to priority levels assigned to the various computers and by a virtual use log within the access log. A system operator can create records in the virtual use log indicating a non-existent use of network resources. Depending upon its assigned priority, each computer may scan portions of the virtual use log and locate conflicting entries which effectively prohibit the computer from accessing the identified resource.

28 Claims, 5 Drawing Sheets

CONTROLLING ACCESS TO NETWORK RESOURCES

FIELD OF THE INVENTION

The invention relates to networks permitting computing devices to share network resources and in particular to mediation of conflicting demands for network resources.

DESCRIPTION OF THE PRIOR ART

Networks have been formed to allow computer users to share resources. These resources may be such items as mass storage media, printers, and modems. The resources may also include individual files or records stored in a mass storage medium. These files may for instance be associated with a data base or may constitute a pool of word processing precedents.

A network must mediate conflicting demands for resources. It is consequently common to restrict access to a given resource at any given time to a single user. Devices commonly referred to as "servers" will control access functions, basically monitoring requests for access to resources by network computers, permitting or denying access according to assigned priorities and the current state of use of the resources. There may be a separate server associated with each distinct network resource.

Dedicating a computer to function exclusively as a server is not normally cost-justified. It is consequently common, for example, to allow one digital computer and an associated mass storage unit to function contemporaneously as a file server and as a local work station for a system user. This arrangement is impractical if the network becomes relatively large and the particular digital computer is required to process a large number of requests for file resources. The local user is in effect deprived of any truly effective use of his computer. The particular user might be provided with a computer which has considerable excess processing capacity but this normally involves considerable expense. Moreover, such measures do not conveniently accommodate situations in which an existing set of computers are to be networked and may not adequately anticipate future expansion of an existing network.

BRIEF SUMMARY OF THE INVENTION

The invention provides a network in which the function of mediating conflicting demands for shared network resources is distributed among the various computing devices connected to the network.

In one aspect, the invention provides a network comprising a plurality of computing devices, a plurality of resources, and storage means containing an access log. A communications channel permits each computing device to access the resources and storage means. Each computing device is adapted to access a required resource according to a resource accessing procedure which comprises recording an entry in the access log identifying the required resource prior to accessing the required resource, scanning the access log prior to accessing the required resource to locate any conflicting entry identifying the required resource, terminating the resource accessing procedure in response to any conflicting entry or accessing the required resource in the absence of any conflicting entry, and deleting the recorded entry when any accessing of the required resource by the computing device is finished. The order in which the steps are performed and the point at which the procedure is terminated will depend on the precise configuration of the network and in particular the manner in which the storage means operate. For example, if the storage means restrict access to a single user then the scanning may simply be performed prior to recording the entry and the access procedure terminated prior to recording the entry. If the storage means are adapted to interleave read and write commands from the various computing devices then it may be desirable to perform the scanning subsequent to recording the entry (to mediate potential conflicts described in greater detail below) and to include deletion of the recorded entry as part of the termination procedure in response to location of any conflicting entry. In any event, the individual computing devices mediate conflicting demands for network resources, and no single device associated with the network need be dedicated to performing the mediating functions.

In another aspect, the invention provides in the above-described network an arrangement for restricting access to system resources according to priority levels assigned to the individual computing devices. The access log includes a multiplicity of storage locations defining a virtual use log. Each computing device is adapted to record entries identifying required resources only in the actual use log. However, a network operator can record entries in the virtual use log identifying a virtual (non-existent) use of system resources. Each computing device is adapted to recognize a priority level assigned to the computing device and to scan the actual use log, and, depending on the priority level assigned to the computing device, to scan the virtual use log (in whole or in part), whenever attempting to locate conflicting entries. Accordingly, if a particular computing device is required to scan the virtual use log and the required resource is identified by a virtual use entry, access to the resource is effectively prohibited for the particular computing device.

It is desirable, as explained more fully below, to uniquely associate each computing device with one storage location in the actual use log where the computing device can record access to a single system resource. Each computing device may be adapted to calculate the location of the associated storage location according to a predetermined formula (which may simply be a function of the unique network identification code commonly associated with a computing device connected to a network) and to record entries identifying single required resources at the calculated location. In another aspect of the invention, a network involving such a unique association between each computing device and one storage location associated with the storage means is adapted to permit each computing device to access two or more of the resources contemporaneously. To that end, the access log comprises a multiplicity of locations defining a multiple entry log identified with a predetermined resource code. The resource accessing procedure includes a procedure responsive to requirements for access to multiple resources, which comprises recording a sign-on entry in the associated storage location identifying the multiple entry log with the predetermined resource code, the multiple entry log effectively being treated as a network resource for which conflicting access demands must be mediated. The first multiplicity of storage locations is scanned for a conflicting sign-on entry identifying the multiple entry log, and the computing device desists from recording of resource entries in the multiple entry log and from accessing the multiple resources in response to any conflicting sign-on entry located. The access log is scanned for conflicting resource entries identifying the multiple resources. If no conflicting resource entries are located, the computing device records a plurality of resource entries in the multiple entry log identifying the multiple resources and then deletes the sign-on entry (to permit other computing devices access to the multiple entry log) and accesses the multiple resources. If conflicting resources entries are located, the multiple resource accessing procedure is terminated. Once any accessing of the resources is finished, the recorded plurality of resource entries are deleted. Once again, the order in which steps in the accessing procedure are performed can be interchanged. For example, the scanning for conflicting resource entries and terminating in response to conflicting resource entries might be performed prior to scanning for conflicting sign-on entries and determining whether the multiply entry log can be accessed for recording of resource entries. The order in which related scanning and recording steps are executed can also be changed, as discussed above, to accommodate the nature of the storage means used.

The access log for purposes of the invention may be formed in multiple duplicate copies. In order to reduce demands on a single storage device such as a file servers, the storage means may comprise a multiplicity of individual storage units each associated with a different one of the computing devices. A duplicate copy of the access log may be stored in each of the storage units, and each computing device may be adapted to scan, record entries in, and delete entries from the associated duplicate copy of the access log during its resource accessing procedure, rather than demanding access to a single storage device containing the only network copy of the access log. In order to ensure that all copies of the network log remains substantially identical, each computing device is adapted to transmit a modification message to each of the other computing devices along the communications channel, indicating each entry recorded and deleted from its duplicate copy of the access log. Each computing device is adapted to modify its associated duplicate copy of the access log in response to each modification message received from the other computing devices.

Other aspects of the invention will be apparent from description of a preferred embodiment below and will be defined in greater detail in the appended claims.

DESCRIPTION OF THE DRAWINGS

The invention will be better understood with reference to drawings illustrating a preferred embodiment of a network, in which.

DESCRIPTION OF PREFERRED EMBODIMENT

Figure 1:
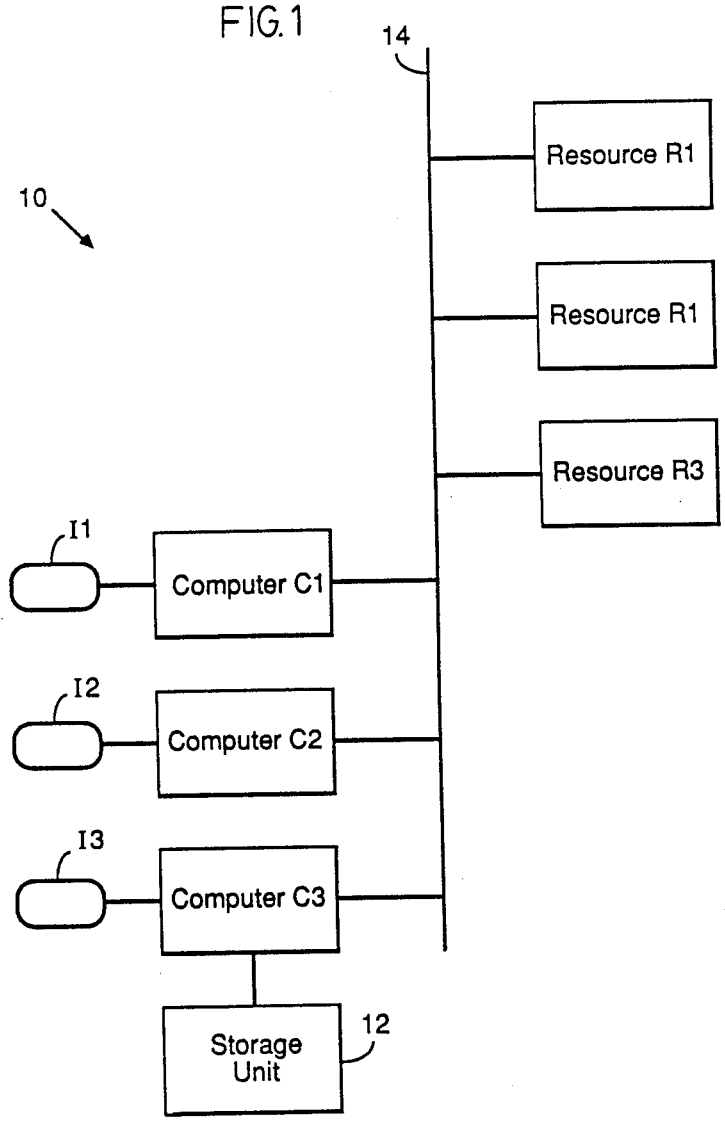
FIG. 1 diagrammatically illustrates the network.
Figure 2:
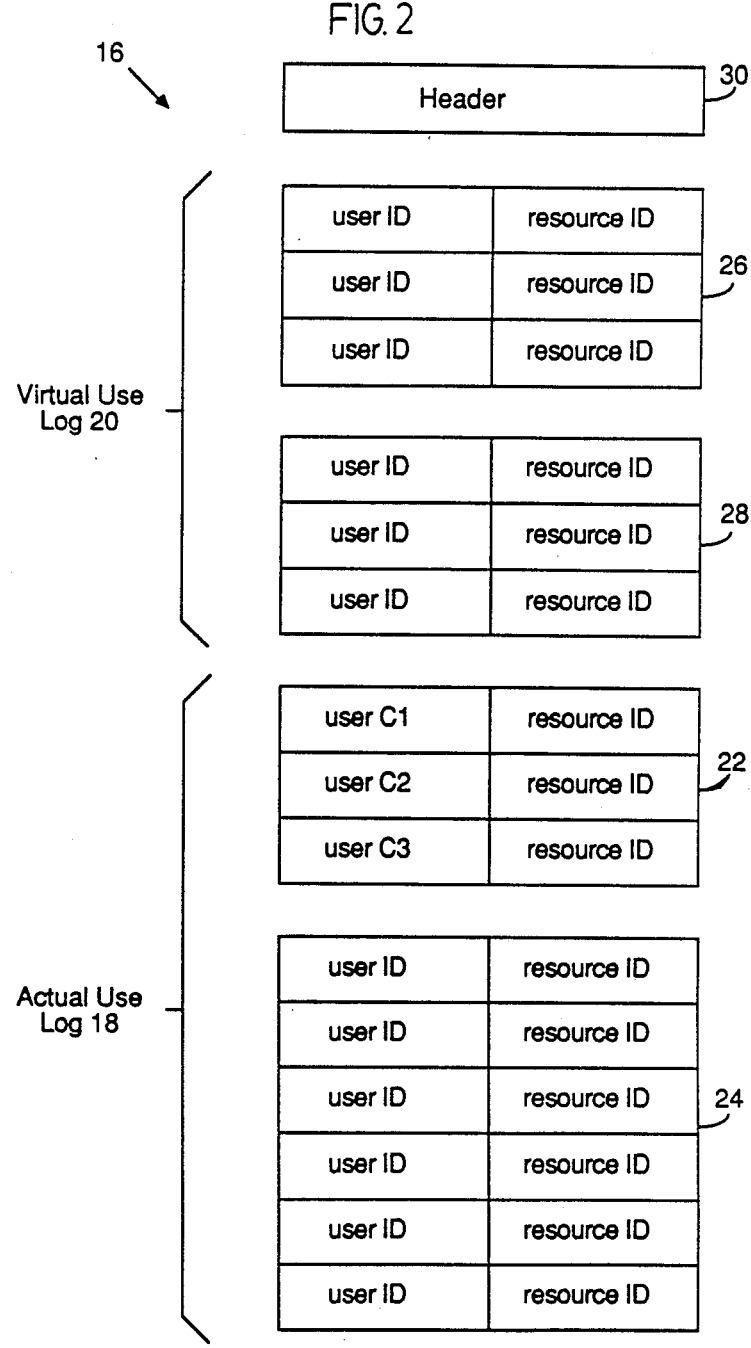
FIG. 2 diagrammatically illustrates an access log associated with the network.

References made to FIG. 1 which provides an overall diagrammatic representation of a network 10. The network 10 comprises three computers C1–C3 with three associated input devices I1–I3, a storage unit 12, and three resources R1–R3. The input devices I1–I3 may be a keyboard, mouse or any other device which, along with other functions normally required of such a device, allows user specification of a requirement for access to the resources R1–R3. The computers C1–C3 may, however, initiate requirements for network resources through their inherent operation. The storage unit 12 may be a disk drive and the computer C3 may function as a file server controlling access to the disk drive and to the access log 16 in a known manner. The resources R1–R3 may be "peripherals", that is, printers, disk drives, modems or other distinct input/output devices. The resource R1–R3 may, however, be disk files, file records, tasks to be distributed among multiple computers or other units of data stored in any appropriate medium. A communications channel 14 permits data transfer between each computer and the resources R1–R3 and storage unit 12. The general configuration and operation of such a network will be apparent to those skilled in the art.

The storage unit 12 contains data defining an access log 16. The access log 16 comprises an actual use log 18 for recording of actual access to resources R1–R3 and a virtual use log 20 where non-existent or virtual use of network resources R1–R3 is recorded. The actual use log 18 comprises a sign-on log 22 and a multiple use log 24, the latter being associated with a predetermined resource identification code. The sign-on log 22 has a dual function: it can be used to record access to single resources; it can also be used to indicate access by one of the computers C1–C3 to the multiple use log 24. The virtual use log 20 comprises two sublogs 26, 28 dedicated to recording virtual entries, which in this particular embodiment of the invention are used effectively to create three priority levels restricting access to the resources on a selective basis. Each of the logs and sublogs is effectively defined by a multiplicity of storage locations as symbolically indicated, but the number of storage locations has been drastically limited for purposes of illustration. A header 30 associated with the access log 16 contains data indicating the number of storage locations and defining a directory indicating the location on the storage unit 12 of the various logs and sublogs. It should be noted that for the broad purposes of the invention the access log 16 need not be a single file or physically located on a single storage device. The multiple entry log 24 might, for example, be a separate file and might be located on a different storage device coupled to the communications channel 14 and effectively treated as a separate and distinct network resource.

Each storage location is capable of retaining an entry comprising two fields: a user identification field and a resource identification field. The user identification field will typically receive the actual name of a network user associated with a particular computer. The resource identification field will typically receive a unique resource code assigned to a particular network resource. The user identification field of each storage location is required primarily to permit each computer to indicate to its associated user which of the other users has preempted a particular resource. Additional fields may be associated with each storage location to provide other information such as access time. The user identification fields of the virtual use log 20 may contain elements of a warning messages to be reproduced when attempts are made to access prohibited resources. If a resource is a disk file, the resource code may typically be the identification code used in the associated disk directory to identify the resource. With respect to a file record, the resource code is preferably a descriptor under which the file record is indexed in the associated file.

In this embodiment of the invention, each computer is associated with the unique storage location in the sign-on log 22. These unique storage locations are allocated or assigned according to a simple formula or function, f(user ID)=user ID+$\beta$, where the user ID is a unique network code assigned to a particular computer and where $\beta$ represents the number of virtual use storage locations preceding the sign-on log 22. The formula effectively maps each user identification code one-to-one onto a number identifying an appropriate storage location. Each computer is programmed to calculate the location of the associated storage location in the access log 16 and, when a single resource is being accessed (which is the most common case), the computer simply records an actual use entry directly in the associated storage location. The storage locations of the actual use log 18 uniquely associated with each of the computers C1–C3 have been identified by placing the same reference characters used to identify the computers C1–C3 in FIG. 1 in the relevant user identification fields of the storage locations.

Although such a unique association between each computer and a storage location in the actual use log 18 is not essential to the broad aspect of the invention, it considerably expedites and simplifies operations involving access to a single resource. With single resource access, calculation and use of a unique storage location avoids the need to scan the access log 16 and test retrieved data to locate an empty storage location where access to a particular resource can be recorded. It also simplifies subsequent finding of a recorded entry for deletion. Most significantly, it avoids the need for a special procedure to mediate conflicting demands for empty storage locations and the risk that an entry may be overwritten. The nature of the sequence of events leading to potentially conflicting demands for empty storage locations will be apparent from the description of analogous problems below. The preferred single resource accessing procedure does, however, complicate recording of contemporaneous access to multiple resources (a less common form of access), which is handled in a manner described more fully below.

Figure 3:
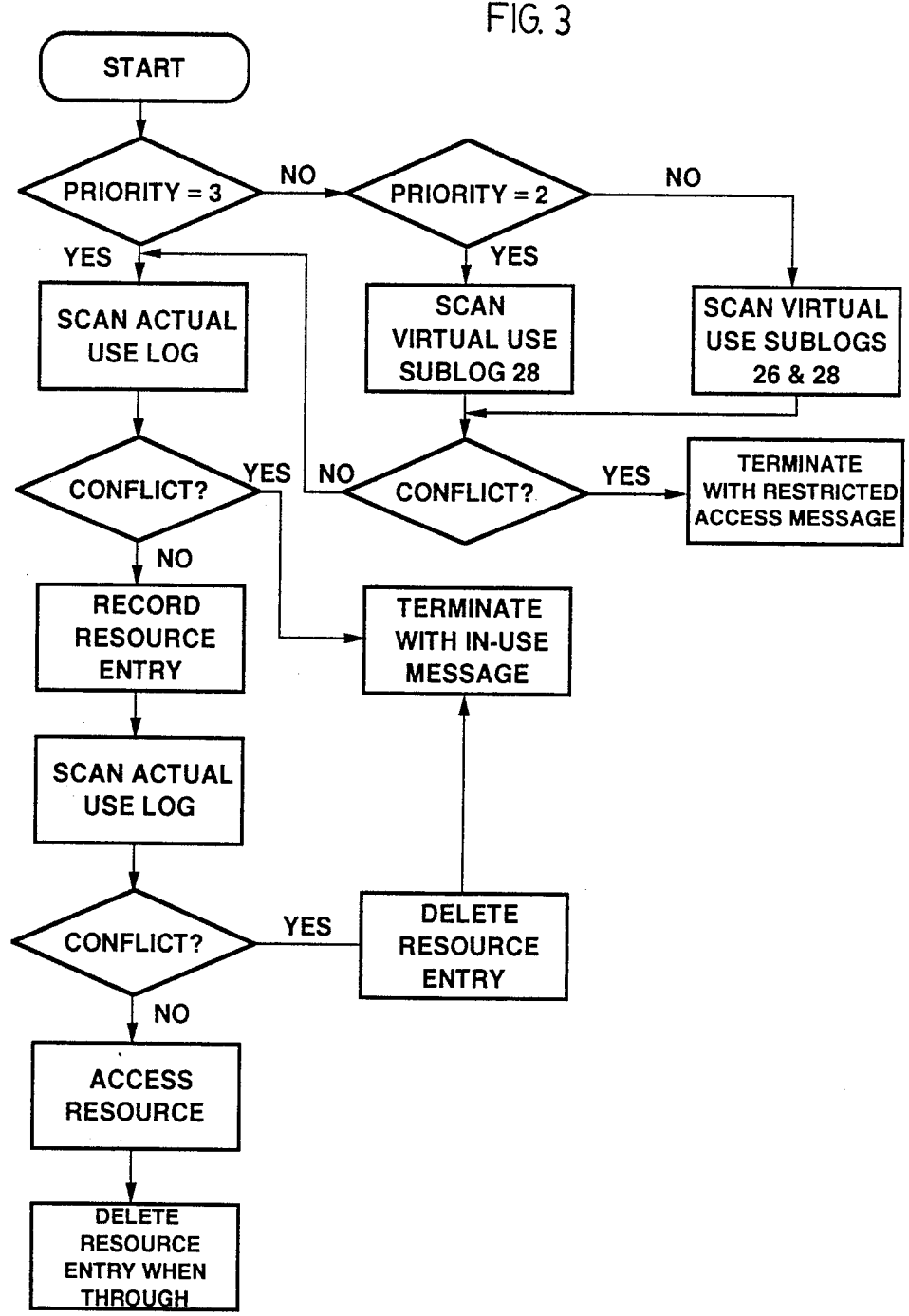
FIG. 3 is a flow chart illustrating an access procedure by which each computer of the network accesses a single system resource.

The resource accessing procedure associated with each computer includes a single resource access procedure and a multiple resource access procedure. The single resource access procedure is illustrated in the flow chart of FIG. 3 and will be described with reference to an attempt by the computer C1 to access the resource R1.

The computer C1 first checks its assigned priority level which is incorporated into the software adapting the computer C1 to implement the access procedures. In the present case, there are three priority levels arbitrarily designated in ascending order of priority as 1, 2 and 3. The computer C1 then scans one or both virtual use sublogs 26, 28 or neither of the sublogs 26, 28 depending on its assigned priority level. If the virtual use log 20 is scanned and a conflicting virtual use entry identifying the required resource R1 is located, the computer C1 terminates the access procedure and indicates to the user that access is prohibited. The computer C1 may be adapted to re-initiate the access procedure a predetermined number of times in the event that a required resource appears to be in actual use by another computer.

If a conflicting virtual use entry is not located, or if the virtual use log 20 is not scanned, the computer C1 then scans the actual use log 18 for conflicting use entries. If such an entry is located in the actual use log 18, the computer C1 terminates the access procedure and indicates to the user that the required resource is not available. If no conflicting entry is located during this initial scanning of the access log 16, the computer C1 records an entry in the associated storage location identifying the resource code associated with the resource R1 in the resource identification field.

The computer C1 then scans the access log 16 again for conflicting entries. If finds a conflicting entry, it then terminates the access procedure indicating to its user that the requested resource R1 is in use and deletes the entry recorded in its associated storage location, deletion simply involving changing the recorded resource value to zero or some other arbitrary value. The reason for performing a scan subsequent to the recording of the entry is to determine whether another computer has written a conflicting entry since recording of the resource entry. Since the storage unit 12 is effectively part of a file server, demands to read and write to the storage unit 12 are interleaved. In such circumstances, a conflict requiring mediation may arise in the following manner. The computer C2 seeking to access the resource R1 scans the access log 16 and finds no conflicting entry. The computer C1 seeking access to the same resource R1 immediately follows this operation with its own scan of the access log 16 and locates no conflicting entry. The computer C2 then records a request for access to the resource R1 in its associated storage location. This potentially conflicting entry has been recorded subsequent to the initial scan by the computer C1, and the computer C1 simply proceeds to record in its associated storage location the same request for the resource R1.

Such a conflict cannot be detected unless each computer is adapted to scan once again after recording its entry. Because of the manner in which the computers C1–C3 are programmed, the computer C2 would detect the conflicting entry recorded by the computer C1 and would then prepare to terminate its access procedure and delete its recorded entry identifying the resource R1. The computer C1 in performing its further scan would detect the conflicting entry of the computer C2 and would similarly prepare to terminate its access procedure and delete its recorded entry. The result is that both computers C1, C2 effectively terminate their attempts to access the resource R1 and indicate to their users that the resource is in use. Instances of such conflicts are expected to be rare, and this type of mediation in which neither computer obtains access is appropriate. It will be appreciated that in this type of operation, the preliminary scanning of the access log 16 is not essential. It is sufficient that each computer log onto the actual use log 18, recording its intention to access particular resource, and thereafter scan for a conflicting entry.

The description of the foregoing potential conflict is useful in understanding the purpose for assigning a unique memory location in the sign-on log 22 to each computer where access to a single resource can be immediately recorded. Attempts to locate empty storage location for such recording would potentially give rise to a similar conflict. This could be resolved by allowing each computer to record a resource entry in any empty storage location located and by adapting each computer to perform a subsequent scan to determine whether the resource entry has effectively been overwritten by another computer. However, such an arrangement is not preferred as it unduly complicates and slows operations.

Figure 4:
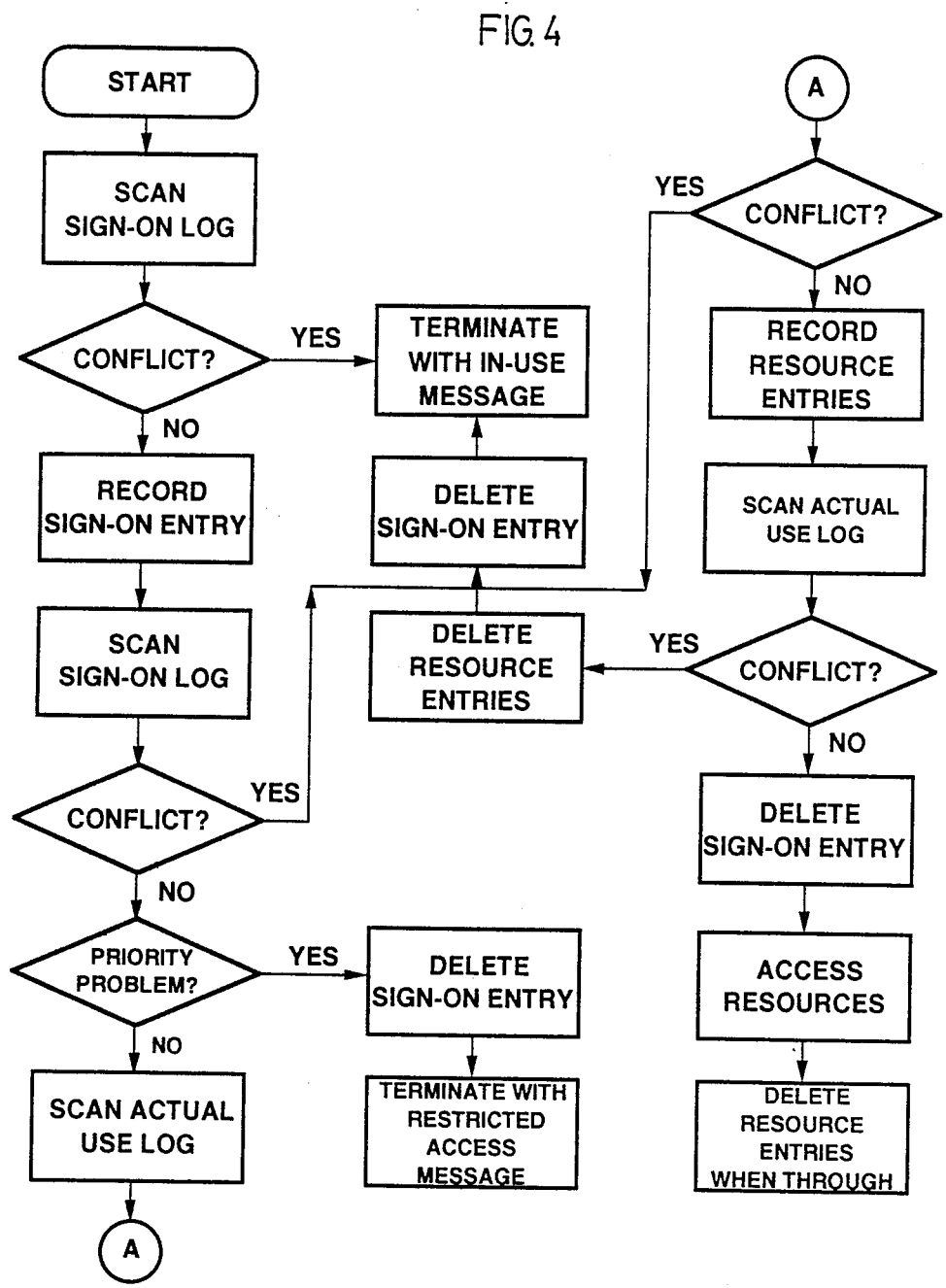
FIG. 4 is a flow chart indicating a multiple resource accessing procedure implemented by each computer.

The multiple resource accessing procedure is illustrated in the flow chart of FIG. 4 and will be described with reference to an attempt by the computer C1 to access resources R1, R2 contemporaneously.

The computer C1 first scans the sign-on log 22 for a conflicting entry identifying the resource code associated with the multiple use log 24. If it finds such a conflicting entry, it then terminates the log-on procedure. It can, however, be programmed to re-initiate the access procedure a predetermined number of times to access the multiple use log 24. If no conflicting sign-on entry is located, the computer C1 records a sign-on entry containing the resource identification associated with the multiple use log 24. It thereafter scans the sign-on log for a conflicting sign-on entry identifying the multiple use log 24, the object being to mediate conflicting demands for the multiple use log 24 in substantially the manner described above. If the conflicting sign-on entry is located, the computer C1 terminates its log-on procedure, and deletes its sign-on entry to avoid encumbering access to the multiple-use log. The computer C1 may be adapted, however, to automatically reinitiate the scan for conflicting sign-on entries a predetermined number of times prior to deleting its sign-on entry and terminating the multiple resource access procedure.

It the computer C1 successfully signs onto the multiple use log 24, it then scans the entirety of the access log 16 for conflicting resource entries. This scan would include one, both or neither of virtual use sublogs 26, 28 according to priority levels set for the computer C1. The flow chart of FIG. 4 does not indicate the scanning and other steps associated with assessing priority levels and restrictions to access, the relevant steps being indicated in the flow chart of FIG. 3. If a conflicting virtual use entry identifying the required resources is located, the computer C1 deletes its sing-on entry, ensuring that the multiple use sublog becomes accessible, and terminates the multiple resource access procedure. The computer C1 may alternatively be programmed to indicate to the user that access is available only to particular requested resources, to request user instructions to proceed with only the non-restricted resources, and then complete the access procedure as if only the non-restricted resources had been requested. If a conflicting actual use entry is located, the computer C1 deletes its sign-on entry and terminates the multiple resource access procedure. Once again, the computer C1 can alternatively be programmed to indicate to the user that certain requested resources are in use, to request user instructions to proceed with only the available resources, and then complete the access procedure as if only the available resources had been requested.

If no conflicting virtual or actual use entries are located, the computer C1 then writes a number of entries in multiple use log 24 identifying the requested resources. This procedure involves scanning the multiple use log 24 for available empty storage locations, but since only the computer C1 has access to the multiple use log 24, no conflicting demands for empty storage locations arises. The computer C1 then scans the access log 16 (restricting the search to the actual use log 18) to mediate any intervening demands for one or more of the required resources. If a conflicting resource entry is located, the computer C1 reports to the user that the requested resources are in use and terminates the accessing procedure, this time deleting both its resource entries and its sign-on entry. Once again, the preliminary scanning steps can be entirely eliminated and entries can be immediately written to indicate a requirement for access to the multiple use log 24 or for access to the multiple resources, each followed with an appropriate scan for conflicting entries.

Requests for access to multiple resources can be implemented in an alternative manner. For example, the use of storage locations uniquely associated with each computer and used to record single resource access can be eliminated. Each computer would then be programmed to find an appropriate number of empty storage locations and to record access requests to the multiple resources in the available memory locations. Mediation of conflicts could be arranged through appropriate scanning for overwritten entries. Such operation, however, is expected to be relatively time-consuming in a large network. The use of a distinct multiple use log 24, treated essentially as a network resource to be accessed by only one user at a time, significantly reduces the mediation problems associated with recording multiple entries.

The manner in which the virtual use log 20 is employed to selectively restric access to the various resources will largely be apparent from the foregoing description of the two accessing procedures. Priority levels may be assigned to each of the computers C1–C3. It will assumed for purposes of illustration that the system operator is located at the computer C3 and has assigned to himself a level 3 priority which permits access to all network resources R1–R3. The computer C3 is be programmed to recognize its assigned level 3 priority and to ignore the virtual use log 20 entirely during scanning of the access log 16 for conflicting use entries. The computer C3 would accordingly be able to access all resources R1–R3 except those which are in actual use by another computer.

The computer C2 might be programmed to recognize its priority as being level 2. In response to its priority level, the computer C2 is programmed to scan the second virtual use sublog 28 in addition to the actual use log 18 during any scanning for a conflicting resource entries. The operator might determine that users operating at level 2 should be prohibited from accessing the resource R1. The operator would at his computer record a virtual use entry in one of the storage locations in the second virtual use sublog 28 indicating a virtual use of the resource R1. Any attempt by the computer C2 to access the resource R1 would result in location of the virtual use entry and would result in a termination of the accessing procedure with a restriction message.

The computer C1 might be assigned a level 1 priority and would respond to its priority level by scanning both virtual use sublogs 26, 28 during any scanning of the access log 16 for conflicting resource entries. The operator might determine that all users at level 1 should be precluded from accessing not only the resource R1 but also the resource R2. The operator would accordingly cause a virtual use entry to be recorded in the virtual use sublog 26 identifying the resource R1. Accordingly, any attempt by the computer C1 to access either of the resources R1, R2 would result in location of a conflicting entry and a consequent termination of the accessing procedure.

The use of a virtual use log permits implementation of priority and restriction schemes in many ways. For example, a separate virtual sublog could simply correspond to each required priority level. Each computer could be programmed to scan in response to its priority level only the appropriate virtual use sublog and the actual use log 18 for conflicting entries.

Each computer would be adapted to scan network storage devices in a conventional manner whenever requesting access to network resources in order to locate the access log 16. The access log 16 can be created during system configuration at the operator's computer C3. The access log 16 is in fact a very simple disk file, and appropriate programming of the computer C3 to create such a log will be readily apparent to those skilled in the art.

Other enhancements to operation may be considered. For example, the operator's computer could be adapted to lock out all users to one or more network resources by permit the writing of entries in the actual use log 18 identifying the particular network resources (without actually accessing the system resources). The actual use log 18 would be expanded in such circumstances to make available the storage locations required to accommodate such entries and the procedure for recording such entries would involve scanning for empty storage locations and mediating conflicts by scanning the entries subsequent to recording to detect overwritten entries. Alternatively, an adequate number of storage locations might be dedicated to such use by the system operator. By writing such virtual use entries to the actual use log 18, each user would thereafter be effectively prohibited from accessing the particular resources and those presently accessing the prohibited resources would be excluded once their access was discontinued.

The network 10 can also be adapted in the alternative to lock out individuals on a temporary basis. For example, the operator's computer can be adapted to record in the user identification field of a user's unique storage location a lock-out code. The various computers operated by users can be be adapted to read the associated user storage location with each attempt to scan the access log 16 and to terminate access procedures if the lock-out code is detected. Subsequent deletion of the lock-out code by the system operator would then permit resource access.

In the embodiment of the invention described herein, the access log is defined by data recorded on a disk drive associated with a file server. A very viable alternative is to provide a hard-wired unit with associated logic to define the required access log and functioning essentially as an addressable peripheral attached directly to the communications channel. Such a peripheral may interleave read and write requirements generated by the network computing devices for the access log. Alternatively, it may restrict log access to a single computing device until all read and write operations necessary to log onto required network resources or to terminate accessing in response to conflicting resource entries are complete. The latter type of operation avoids conflicting demands for log resources and makes the timing of scanning for conflicting resource entries less critical, but may slow the overall operation of a large network considerably.

The term "adapted" as use in this specification with respect to computing devices is intended to mean that they are programmed to implement required accessing procedures. The implementation of appropriate programs will be apparent to those skilled in the art from the flow charts provided and from the description of required operation. With respect to digital computers, the required programs are preferably in the form of application software on diskettes and preferably operable in tandem with already available networking software which otherwise regulates overall network operation. Alternatives for various computing devices would include providing adaption cards or peripherals containing the required program steps in appropriate memory units or by hard-wiring the necessary logic.

With respect to retrieval of file records as network resources, it should be noted that a conflict may potentially arise if the associated file can be identified in its entirety as a network resource under a resource identification code different from that of individual file records. Basically, one computer may have obtained access to the entirety of the file, recording the file resource code in the access log, while another computer attempts to access an individual record within the file, recording the resource identification code of the record in the access log. This problem arises whenever a unit of data identified by a distinct resource code is in fact a subset of a larger unit of data identified by its own resource code. To assess whether a conflicting entry exists in such circumstances, each computer must be adapted to mediate conflicts by searching the access records for an indication that a set and subset or overlapping relationship exists between resources already in use and the resource required by the computer. In the case of a file and record relationship, the computer seeking access to a particular record would be required to search the access log to determine whether the relevant file identification code is contained in a conflicting entry. Such operation will be very much dependent on the nature of the application software used to access the file and would require custom programming to provide the necessary mediation of conflicts.

Figure 5:
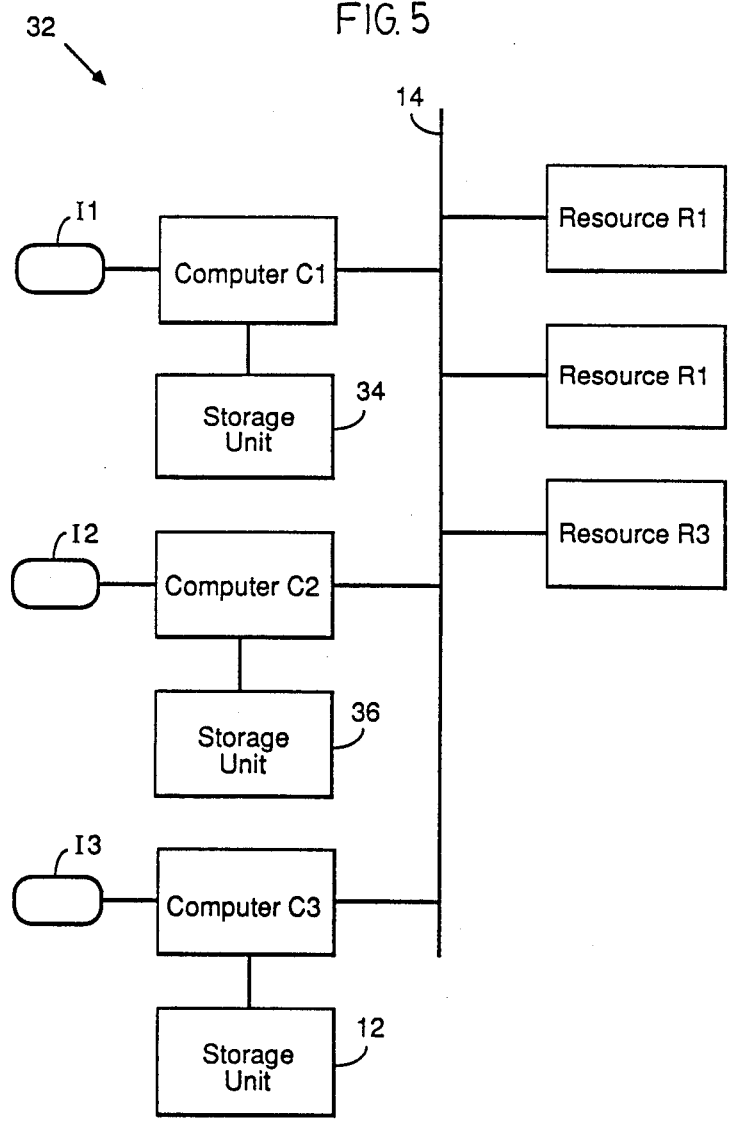
FIG. 5 diagrammatically illustrates an alternative network in which each network computing device is uniquely associated with a separate duplicate copy of a network access log.

An alternative embodiment of the invention, a network 32, is illustrated diagrammatically in FIG. 5. Components common to the network 10 have been indicated with the same reference characters and numerals, and their overall operation may be understood with reference to the foregoing description of the network 10. The principal difference in overall configuration relates to the provision of separate storage units 34, 36 associated respectively with the computers C1 and C2. These storage units 34,36 are required to store a copy of the access log as would be stored in the storage unit 12 associated with the computer C3. For such purposes, the storage units 34,36 may typically be disk drives or other mass storage devices, but would preferably be the random access memory (RAM) typically associated with the respective computers. The overall resource accessing procedures associated with the computing devices C1–C3 in the network 32 are similar to their corresponding procedures in the network 10. Only differences between such procedures will consequently be described.

During the resource accessing procedure, each computer C1-C3 scans only the associated duplicate copy of the access log, that is, the copy contained in the associated storage unit 34,36 or 12, respectively. Each computer is adapted to transmit a modification message corresponding to any entry which it records in its associated duplicate copy of the access log when implementing its resource accessing procedure and also to transmit a modification message indicating when it deletes any entry which it has recorded pursuant to its resource accessing procedure. These messages are transmitted via the communications channel 14 to the other computers. Each computer C1-C3 is adapted to respond to the modification messages transmitted by the other computers by recording and deleting entries from its associated copy of the access log according to the nature of the modification message received. Basically, each computer records a corresponding entry indicating an attempt to access a resource by another computer and deletes such an entry from the associated copy of the access log when the other computer indicates with its modification message that it has itself performed such a deletion in its own duplicate copy of the access log. The general object is to ensure that the various duplicate copies of the access log are identical for purposes of indicating resource use so that each computer C1-C3 is capable of mediating its own potentially conflicting demands for system resources by simply scanning its own log. Use of multiple copies of the access log in the manner described can be expected to expedite resource accessing procedures in large networks, as each computing device can immediately identify whether a system resource is in use, without requiring access to a file server or other central storage means containing the access log. There is also less demand placed on a single file server or equivalent device that would otherwise regulate access to a single copy of the access log.

The storage unit 12 may remain the master unit for start-up purposes, the computer C3 being the first started and the last shut off during network operations. Each of the computers C1 and C2 can then be adapted on start-up to broadcast an enquiry message along the communications channel requesting transmission of a copy of the access log. The computer C3 can be adapted to respond by transmitting to the requesting computer a complete copy of the access log as stored in the storage unit 12, and resource accessing procedures may be suspended during such transmission to ensure that a current copy of the access log is provided. This ensures that each computer is effectively made aware of the current status of resource access upon start-up in the network.

An alternative arrangement involves adapting each of the computers C1-C3 to serve potentially as the master source of the access log. The start-up procedure for each computer involves an immediate transmission of a request for a copy of the access log. If there is no response to the enquiry, indicating that the other computers are still inoperative, the particular computer can be adapted to create an access log and thereafter to respond to all system requests for a copy of the access log, effectively as the computing device containing the master copy of the access log. Matters such as general network communications and recognition of the presence of active computing devices in a network are now common general knowledge and will not be described.

Other matters may be considered in connection with the implementation of any network according to the invention. In particular, it would be desirable to conveniently accommodate the failure of any computing device, commonly referred to as a "crash", or a sudden shut down by the associated user. The particular problem which arises is that the failed computing device may have written an entry to the access log thereby precluding access to a particular system resource and may have failed without opportunity to remove the entry. The solution to this problem involves adapted each computing device to transmit enquiry message to other computers regarding access to resources which have been unavailable for a predetermined period of time. Each computing device can be adapted to respond immediately to such enquiry messages by transmitting a message indicating that it continues to access a particular resource. The absence of a response indicates a failure of the computing device and enables the enquiring computer to delete from the access log (whether a single copy or multiple duplicate copies) all access entries which have been recorded by the failed device. Additionally, each computing device would be adapted automatically on start-up (as, for example, a re-start after a crash) to scan the access log and delete any entries which it had previously recorded.

It will be appreciated that particular embodiments of the invention has been described and that modifications may be made therein without departing from the spirit of the invention or necessarily departing from the scope of the appended claims. In the appended claims, the term "conflicting" as used in respect of an entry in an access log being scanned by a computing device should be understood as indicating an entry which identifies a resource (peripheral, multiple-use log etc.) the computing device is seeking to access and which has been recorded by another device to indicate the latter's actual use of the resource or has been recorded in the log to indicate a virtual use of the resource. A conflicting entry generally indicates to a computing device scanning an access log that a required resource is already in use by another device either on an actual or virtual basis.

I claim:

1. A network, comprising:
   a plurality of computing devices;
   a plurality of resources;
   storage means containing data defining an access log;
   a communications channel permitting each computing device to access each of the resources and the storage means for data transfer;
   each computing device being adapted to access a required one of the resources according to a resource accessing procedure comprising;
   a. recording an entry in the access log identifying the required resource prior to any accessing of the required resource;
   b. scanning the access log prior to any accessing of the required resource to locate any conflicting entry identifying the required resource;
   c. terminating the resource accessing procedure in response to any conflicting entry located during the scanning of the access log;
   d. accessing the required resource in response to the absence of any conflicting entry in the access log;
   e. deleting the recorded entry when any accessing of the required resource by the computing device is finished.

2. The network of claim 1 in which the said scanning of the access log is performed subsequent to the recording of the entry and in which the said terminating of the resource accessing procedure includes deleting the recorded entry.

3. The network of claim 2 in which the resource accessing procedure comprises a preliminary scanning of the access log prior to recording the entry in the access log to locate any conflicting entry and terminating the resource accessing procedure without accessing the required resource in response to any conflicting entry located during the preliminary scanning.

4. The network of claim 1 adapted to restrict access to any one of the resources according to priority levels assigned to each computing device, in which:
   the access log includes a multiplicity of storage locations defining an actual use log and a multiplicity of storage locations defining a virtual use log;
   each computing device is adapted to record any entry identifying a required resource only in the actual use log;
   each computing device is adapted to recognize a priority level associated with the computing device;
   each computing device is adapted to scan the actual use log and depending on the priority level assigned to the computing device to scan the virtual use log whenever scanning the access log to locate conflicting entries.

5. The network of claim 4 in which at least one of the computing devices is adapted to record entries in the virtual use log and to permit selective recording of a virtual use of the resources in the storage locations associated with the virtual use log.

6. The network of claim 1 in which:
   the access log comprises a first multiplicity of storage locations, each computing device being uniquely associated with one of the first multiplicity of storage locations;
   each computing device is adapted to calculate the location of the associated storage location according to a predetermined formula and to record an entry identifying a requirement for a single resource only at the calculated location.

7. The network of claim 6 adapted to permit each computing device to access multiple resources among the plurality of resources contemporaneously, in which:
   the access log comprises a second multiplicity of storage locations defining a multiple entry log identified with a predetermined resource code;
   the resource accessing procedure of each computing device includes a multiple resource accessing procedure initiated in response to a requirement for access to multiple resources, the multiple resource accessing procedure comprising;
   a. recording a sign-on entry in the associated storage location identifying the multiple entry log with the predetermined resource code prior to recording any entries in the multiple entry log;
   b. scanning the first multiplicity of storage locations for a conflicting sign-on entry identifying the multiple entry log;
   c. desisting from recording entries in the multiple entry log and from accessing the multiple resources in response to any conflicting sign-on entry located during the scanning for a conflicting sign-on entry;
   d. scanning the access log for conflicting resource entries identifying the multiple resources;
   e. recording a plurality of resource entries in the multiple entry log identifying the multiple resources and then deleting the sign-on entry and accessing the multiple resources, in the event that no conflicting resource entries are located during the scanning for conflicting resource entries;
   f. terminating the multiple resource accessing procedure in the event that a conflicting resource entry is located during the scanning for conflicting resource entries;
   g. deleting the recorded plurality of resource entries when any accessing of the multiple resources by the computing device is finished.

8. The network of claim 7 in which the scanning for conflicting sign-on entries is performed subsequent to the recording of the sign-on entry and in which the recorded sign-on entry is deleted and the multiple resource accessing procedure is terminated in response to location of any conflicting sign-on entry.

9. The network of claim 7 in which the multiple resource accessing procedure comprises a preliminary scanning of the first multiplicity of storage locations prior to recording the sign-on entry to locate any conflicting sign-on entry and terminating the multiple resource accessing procedure in the event that a conflicting sign-on entry is located.

10. The network of claim 7 in which the scanning of the access log for conflicting resource entries is performed subsequent to the recording of the plurality of resource entries and the terminating of the multiple resource access procedure in the event that a conflicting resource entry is located comprises deleting the plurality of resource entries.

11. The network of claim 10 in which the multiple resource accessing procedure comprises the additional step of scanning the access log prior to recording the plurality of resource entries to locate any conflicting resource entry and thereupon terminating the multiple resource access procedure in the event that any conflicting resource entry is located.

12. The network of claim 1 in which:
   the storage means comprises a plurality of storage units, each of the storage units being associated with and accessible for data transfer by a different one of the plurality of computing devices;
   a plurality of duplicate copies of the access log is stored in each of the plurality of storage units, one of the plurality of duplicate copies of the access log being associated with each of the computing devices;
   each computing device is adapted:
   a. to scan, record entries in, and delete entries from the associated duplicate copy of the access log during the resource accessing procedure;
   b. to transmit a modification message to each of the other computing devices along the communications channel indicating each entry recorded and deleted from the associated duplicate copy during the resource accessing procedure of the computing device;
   c. to modify the associated duplicate copy of the access log in response to each modification message received from the other computing devices.

13. The network of claim 1 in which:
   the storage means comprises a plurality of storage units, each of the storage units being associated with and accessible for data transfer by a different one of the plurality of computing devices;

a plurality of duplicate copies of the access log is stored in each of the plurality of storage units, one of the plurality of duplicate copies of the access log being associated with each of the computing devices;

each computing device is adapted:
a. to scan, record entries in, and delete entries from the associated duplicate copy of the access log during the resource accessing procedure;
b. to transmit a modification message to each of the other computing devices along the communications channel indicating each entry recorded and deleted from the associated duplicate copy during the resource accessing procedure of the computing device;
c. to modify the associated duplicate copy of the access log in response to each modification message received from each of the other computing devices.

14. A network, comprising:
a plurality of computing devices;
a plurality of resources;
storage means storing data defining an access log;
a communications channel permitting each computing device to access each of the resources and the storage means for data transfer;
each computing device being adapted to access a required one of the resources according to a resource accessing procedure comprising:
a. recording an entry in the access log identifying the required resource;
b. scanning the access log subsequent to recording the entry to locate any conflicting entry identifying the required resource;
c. terminating the resource accessing procedure without accessing the required resource in the event that a conflicting entry is located, the terminating including deleting the recorded entry;
d. accessing the required resource in the event that a conflicting entry is not located and deleting the recorded entry when the computing device discontinues the accessing of the required resource.

15. The network of claim 14 adapted to restrict access to any one of the resources according to priority levels assigned to each computing device, in which:
the access log includes a multiplicity of storage locations defining an actual use log and a multiplicity of storage locations defining a virtual use log;
each computing device is adapted to record any entry identifying a required resource only in the actual use log;
each computing device is adapted to recognize a priority level associated with the computing device;
each computing device is adapted to scan the actual use log and depending on the priority level assigned to the computing device to scan the virtual use log whenever scanning the access log to locate conflicting entries.

16. A network, comprising:
a plurality of computing devices;
a plurality of peripherals;
storage means containing data defining an access log;
a communications channel permitting each computing device to access each of the peripherals and the storage means for data transfer;
each computing device having an input device permitting a user to select a peripheral for data transfer between the computing device and the selected peripheral and being adapted to respond to selection of the selected peripheral according to a peripheral accessing procedure comprising:
a. recording an entry in the access log identifying the selected peripheral prior to any accessing of the selected peripheral;
b. scanning the access log prior to any accessing of the selected peripheral to locate any conflicting entry identifying the selected peripheral;
c. terminating the peripheral accessing procedure in response to any conflicting entry located during the scanning of the access log;
d. accessing the selected peripheral in response to the absence of any conflicting entry in the access log;
e. deleting the recorded entry when any accessing of the selected peripheral by the computing device is finished.

17. The network of claim 16 in which the said scanning of the access log is performed subsequent to the recording of the entry and in which the said terminating of the peripheral accessing procedure includes deleting the recorded entry.

18. The network of claim 17 in which the peripheral accessing procedure comprises a preliminary scanning of the access log prior to recording the entry in the access log to locate any conflicting entry and terminating the peripheral accessing procedure without accessing the selected peripheral in response to any conflicting entry located during the preliminary scanning.

19. The network of claim 16 adapted to restrict access to any one of the peripherals according to priority levels assigned to each computing device, in which:
the access log includes a multiplicity of storage locations defining an actual use log and a multiplicity of storage locations defining a virtual use log;
each computing device is adapted to record any entry identifying a selected peripheral only in the actual use log;
each computing device is adapted to recognize a priority level associated with the computing device;
each computing device is adapted to scan the actual use log and depending on the priority level assigned to the computing device to scan the virtual use log whenever scanning the access log to locate conflicting entries.

20. The network of claim 19 in which at least one of the computing devices is adapted to record entries in the virtual use log and to permit selective recording of a virtual use of the peripherals in the storage locations associated with the virtual use log.

21. The network of claim 16 in which:
the access log comprises a first multiplicity of storage locations, each computing device being uniquely associated with one of the first multiplicity of storage locations;
each computing device is adapted to calculate the location of the associated storage location according to a predetermined formula and to record an entry identifying a requirement for a single peripheral only at the calculated location.

22. The network of claim 21 adapted to permit each computing device to access multiple peripherals among the plurality of peripherals contemporaneously, in which:

the access log comprises a second multiplicity of storage locations defining a multiple entry log identified with a predetermined peripheral code;

the peripheral accessing procedure of each computing device includes a multiple peripheral accessing procedure initiated in response to a requirement for access to multiple peripherals, the multiple peripheral accessing procedure comprising:

a. recording a sign-on entry in the associated storage location identifying the multiple entry log with the predetermined peripheral code prior to recording any entries in the multiple entry log;

b. scanning the first multiplicity of storage locations for a conflicting sign-on entry identifying the multiple entry log;

c. desisting from recording entries in the multiple entry log and from accessing the multiple peripherals in response to any conflicting sign-on entry located during the scanning for a conflicting sign-on entry;

d. scanning the access log for conflicting peripheral entries identifying the multiple peripherals;

e. recording a plurality of peripheral entries in the multiple entry log identifying the multiple peripherals and then deleting the sign-on entry and accessing the multiple peripherals, in the event that no conflicting peripheral entries are located during the scanning for conflicting peripheral entries;

f. terminating the multiple peripheral accessing procedure in the event that a conflicting peripheral entry is located during the scanning for conflicting peripheral entries;

deleting the recorded plurality of peripheral entries when any accessing of the multiple peripherals by the computing device is finished.

23. The network of claim 22 in which the scanning for conflicting sign-on entries is performed subsequent to the recording of the sign-on entry and in which the recorded sign-on entry is deleted and the multiple peripheral accessing procedure is terminated in response to location of any conflicting sign-on entry.

24. The network of claim 23 in which the scanning of the access log for conflicting peripheral entries is performed subsequent to the recording of the plurality of peripheral entries and the terminating of the multiple peripheral access procedure in the event that a conflicting peripheral entry is located comprises deleting the plurality of peripheral entries.

25. The network of claim 24 in which the multiple peripheral accessing procedure comprises the additional step of scanning the access log prior to recording the plurality of peripheral entries to locate any conflicting peripheral entry and thereupon terminating the multiple peripheral access procedure in the event that any conflicting peripheral entry is located.

26. The network of claim 22 in which the multiple peripheral accessing procedure comprises a preliminary scanning of the first multiplicity of storage locations prior to recording the sign-on entry to locate any conflicting sign-on entry and terminating the multiple peripheral accessing procedure in the event that a conflicting sign-on entry is located.

27. The network of claim 16 in which:

the storage means comprises a plurality of storage units, each of the storage units being associated with and accessible for data transfer by a different one of the plurality of computing devices;

a plurality of duplicate copies of the access log is stored in each of the plurality of storage units, one of the plurality of duplicate copies of the access log being associated with each of the computing devices;

each computing device is adapted:

a. to scan, record entries in, and delete entries from the associated duplicate copy of the access log during the resource accessing procedure;

b. to transmit a modification message to each of the other computing devices along the communications channel indicating each entry recorded and deleted from the associated duplicate copy during the resource accessing procedure of the computing device;

c. to modify the associated duplicate copy of the access log in response to each modification message received from each of the other computing devices.

28. A network:

a plurality of computing devices, each computing device being operably coupled to a different one of a plurality of storage units, each storage unit containing data defining a copy of an access log which copy is associated with the computing device coupled to the storage unit;

a communications channel permitting each computing device to access each of the resources and each of the other computing devices for data transfer;

each computing device being adapted to access a required one of the resources according to a resource accessing procedure comprising:

a. scanning the associated copy of the access log prior to any accessing of the required resource to locate any conflicting entry identifying the required resource;

b. terminating the resource accessing procedure in response to any conflicting entry located during the scanning of the associated copy of the access log;

c. accessing the required resource in response to the absence of any conflicting entry in the associated copy of the access log;

d. recording an entry identifying the required resource in the associated copy of the access log prior to any accessing of the required resource and transmitting a message corresponding to the recorded entry along the communications channel to each of the other computing devices;

e. deleting the recorded entry from the associated copy of the access log when any accessing of the required resource by the computing device is finished and transmitting a message along the communications channel to each of the other computing devices indicating deletion of the recorded entry;

each of the computing devices being adapted to respond to each message received from each of the other computing devices by recording and deleting entries in the associated copy of the access log according to the message received such that the copies of the access log associated with the computing devices remain substantially identical.

* * * * *